No. 756,858. PATENTED APR. 12, 1904.
C. JOHNSON.
MACHINE FOR MAKING WIRE FENCE REEL HEADS.
APPLICATION FILED JUNE 15, 1903.
NO MODEL. 5 SHEETS—SHEET 1.

WITNESSES
INVENTOR
CHARLES JOHNSON
BY
HIS ATTORNEYS

No. 756,858. PATENTED APR. 12, 1904.
C. JOHNSON.
MACHINE FOR MAKING WIRE FENCE REEL HEADS.
APPLICATION FILED JUNE 15, 1903.
NO MODEL. 5 SHEETS—SHEET 2.

WITNESSES.
INVENTOR
CHARLES JOHNSON
BY
HIS ATTORNEYS

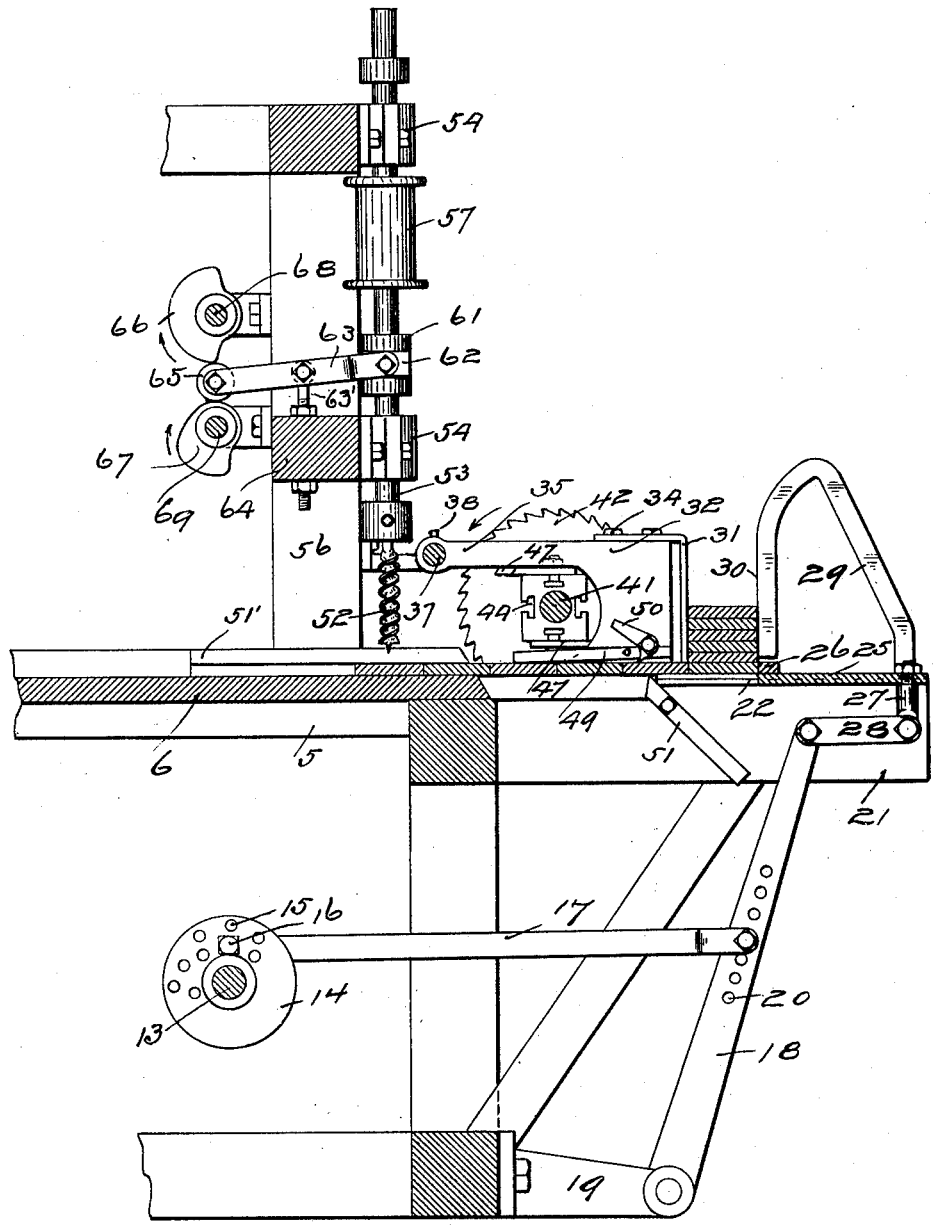

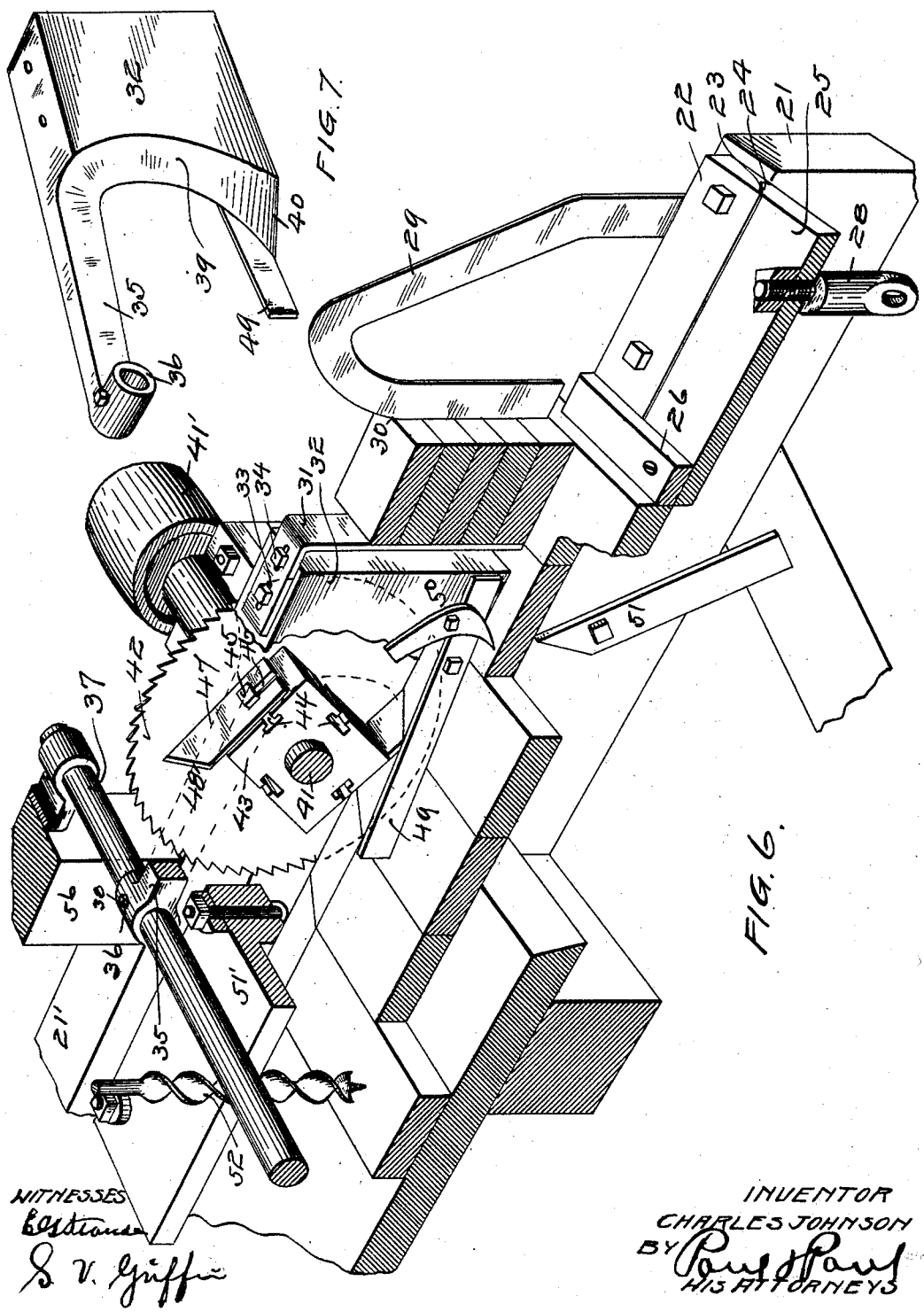

No. 756,858. Patented April 12, 1904.

UNITED STATES PATENT OFFICE.

CHARLES JOHNSON, OF MINNEAPOLIS, MINNESOTA, ASSIGNOR TO CHARLES A. SMITH, OF MINNEAPOLIS, MINNESOTA.

MACHINE FOR MAKING WIRE-FENCE-REEL HEADS.

SPECIFICATION forming part of Letters Patent No. 756,858, dated April 12, 1904.

Application filed June 15, 1903. Serial No. 161,516. (No model.)

*To all whom it may concern:*

Be it known that I, CHARLES JOHNSON, of Minneapolis, county of Hennepin, State of Minnesota, have invented certain new and useful Improvements in Machines for Making Wire-Fence-Reel Heads, of which the following is a specification.

My invention relates to woodworking machinery.

Wire-fence reels are usually made of heads connected by cleats around which the wire is wound, each head being composed of crosspieces, the inner having its ends beveled to prevent the wire from catching thereon as it is being wound upon the reel. It has been customary in making these reels to trim the ends of boards to make the head-pieces, bevel the ends of the inner strips, and bore the holes for the reel-spindle by separate operations, the beveling being usually performed by holding the head-pieces by hand at an angle against a saw. This method of making the reels I have found to be slow and laborious and requiring the services of several men and a corresponding number of machines.

The object, therefore, of my invention is to provide a machine wherein the operation of trimming and beveling the ends of the boards forming the head-pieces and finally boring holes in them can be automatically and successively performed, attendants being required only to supply the lumber to the machine and remove the finished reel head-pieces.

Other objects of the invention will appear from the following detailed description.

The invention consists generally in various constructions and combinations, all as hereinafter described, and particularly pointed out in the claims.

Figure 1:
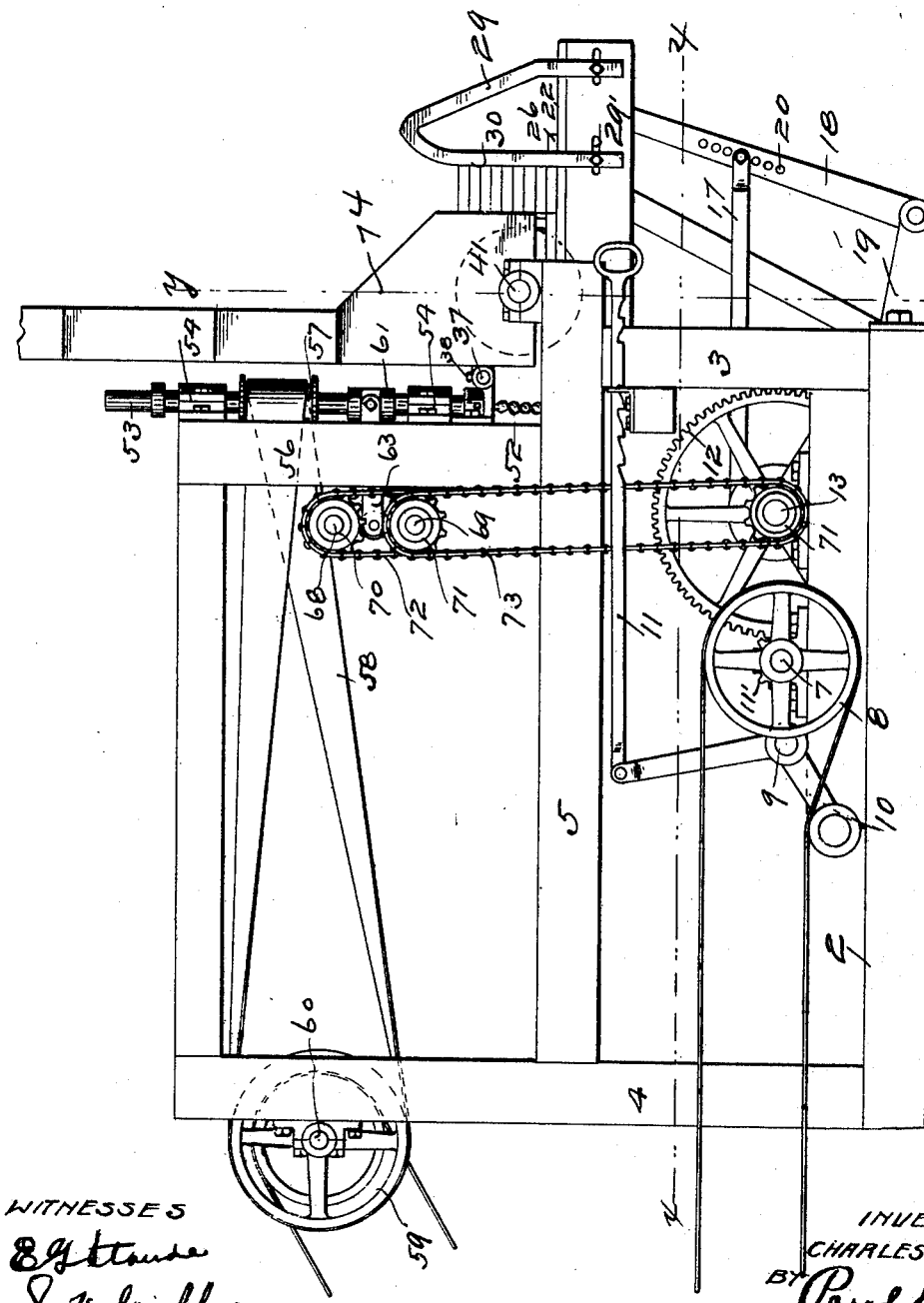
Figure 2:
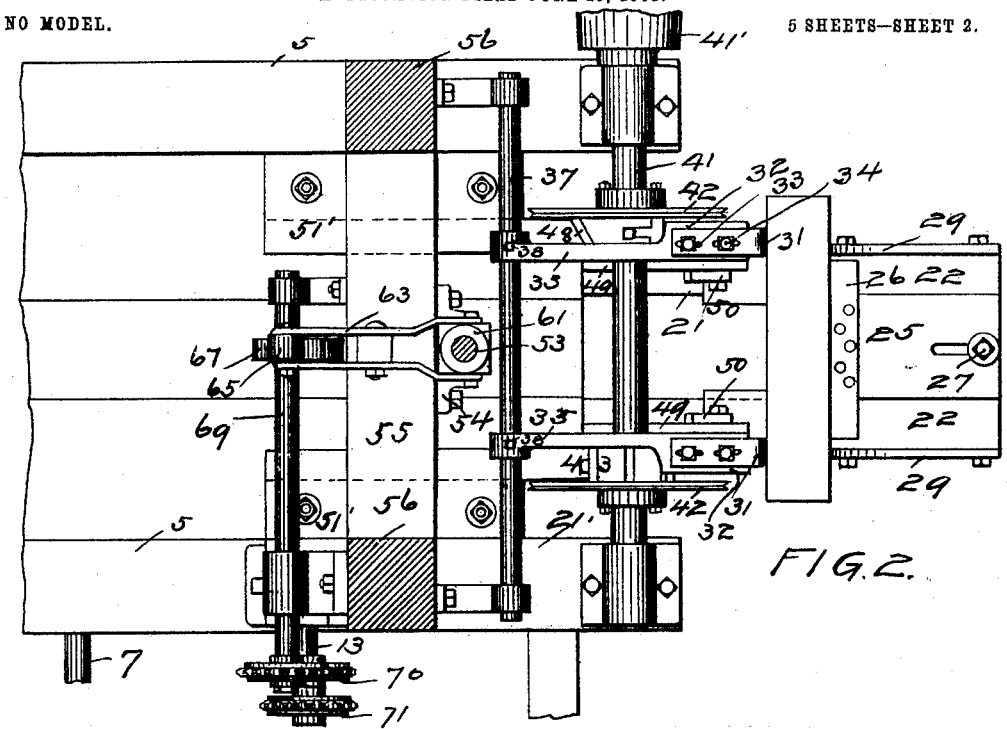
Figure 3:
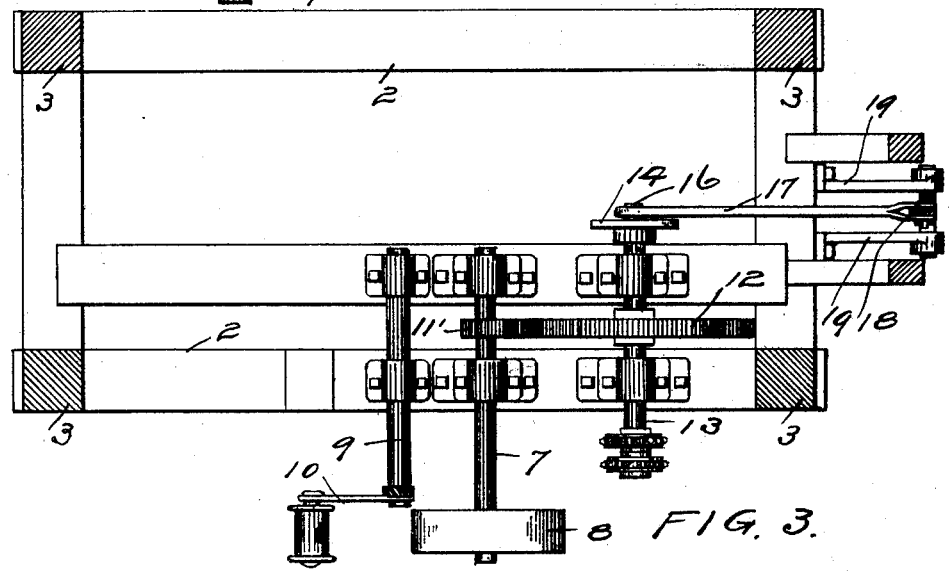
Figure 4:
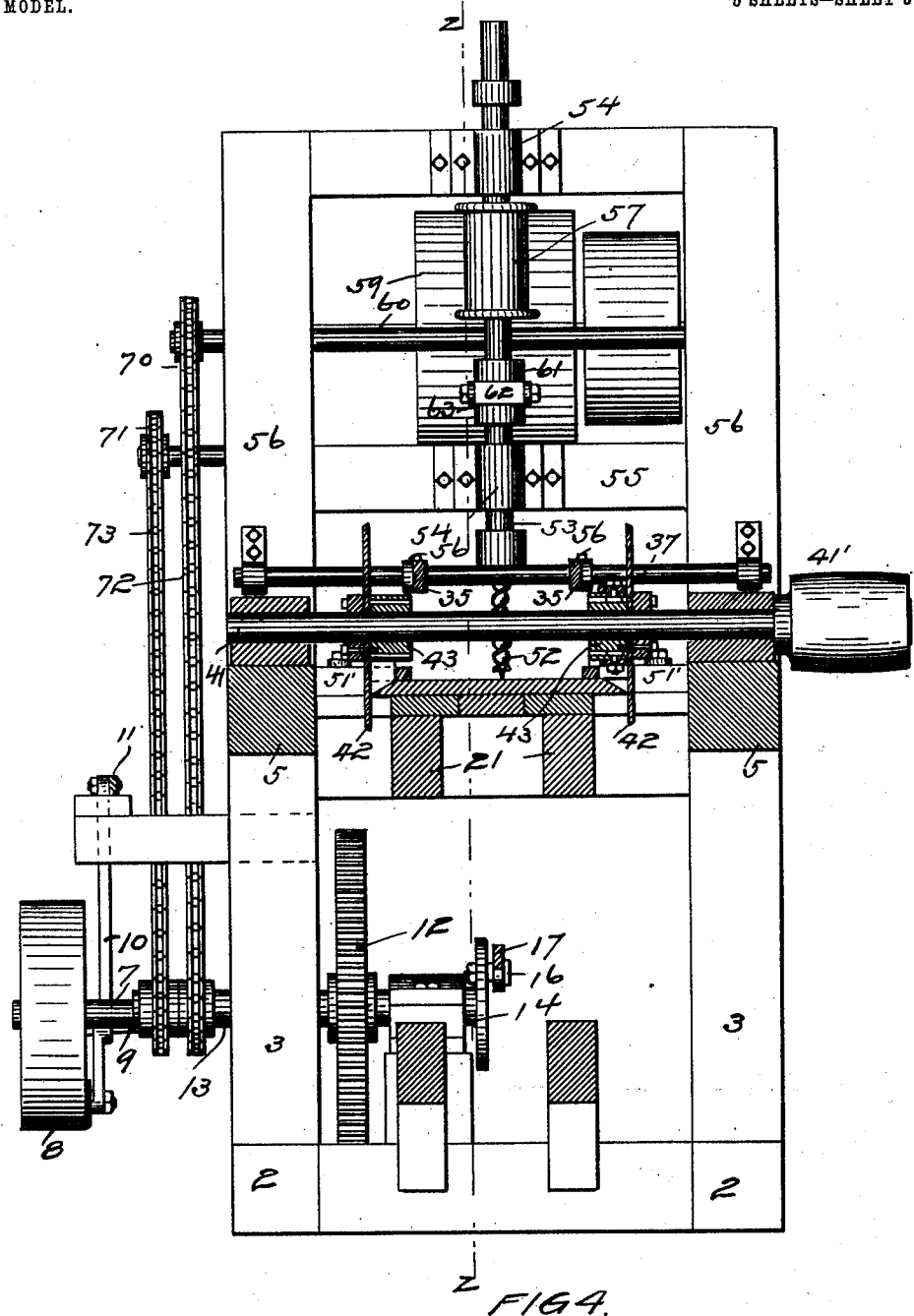

In the accompanying drawings, forming part of this specification, Figure 1 is a side elevation of a reel-head-making machine embodying my invention. Fig. 2 is a plan view of the same. Fig. 3 is a horizontal section substantially on the line $x\ x$ of Fig. 1. Fig. 4 is a transverse vertical section on the line $y\ y$ of Fig. 1. Fig. 5 is a longitudinal vertical section on the line $z\ z$ of Fig. 4. Fig. 6 is a perspective view in detail, showing the successive steps of trimming and beveling the ends of the boards and boring a hole through the center of them. Fig. 7 is similar view showing the block that coöperates with the knives in the operation of beveling the ends of the boards.

In the drawings I have shown a frame comprising suitable base-timbers 2, with upright timbers 3 and 4 supported thereon, and horizontal timbers 5, supported by said upright timbers and carrying a suitable table 6, over which the boards travel.

7 is a shaft mounted in bearings on the base-timbers and provided with a driven pulley 8.

9 is a rock-shaft supporting a belt-tightening device 10, that is operated by a notched bar 11 in the usual way. A pinion 11' is provided on the shaft 7, meshing with a gear 12 on a shaft 13, also mounted in bearings on the base-timbers and provided with an eccentric 14. A series of holes 15 is provided in the eccentric at different distances from the center and adapted to receive a wrist-pin 16, by means of which a pitman 17 is connected at one end to said eccentric. The opposite end of the pitman is pivotally connected with an oscillating arm 18, mounted in bearings in a bracket 19 at its lower end and provided with a series of holes 20, wherein the pitman connection is adjustable to vary the stroke of said arm. Timbers 21 project horizontally from the frame of the machine, and secured on said timbers are guide-blocks 22, having grooves 23 in their inner edges, forming guideways to receive the beveled edges 24 of a sliding plate 25. This plate is provided at its inner end with a follower-block 26, that is slidable on the blocks 21, and near its outer end the said plate is provided with a depending pin 27, to which the upper end of the arm 18 is pivotally connected by a link 28. The oscillation of the arm 18 will move the plate 25 horizontally back and forth in its guideways to feed the lumber to the saws, and the length of the stroke of said plate can be easily regulated by means of the adjusting devices heretofore referred to. Brackets 29 are provided on the timbers 21 and extend for a considerable distance above the same and have vertical inner edges 30, which, with the depending fingers 31, form the walls of a hopper wherein the pile of boards is placed, resting upon the base or guide blocks 22. The follower-block, as shown in Fig. 6, operates between the brackets 29, and I prefer to cut away one leg of one of the brackets to allow the substitution of a longer follower-block when it is desired to feed lumber of any considerable length to the saws. Both of the brackets 29 are adjustable in slots 29′ in the timbers 21 to permit the distance between them and the auger, hereinafter described, to be regulated according to the width of the lumber. The fingers 31 are adjustable on chip-breakers 32 by means of bolts 33 and slots 34, and by adjusting these fingers the operator can provide the proper distance between them and the auger, so that, regardless of the width of the lumber, each head-piece will be centrally bored. The chip-breakers 32 have arms 35, provided with bearings 36 on a rock-shaft 37, said arms being adjustable longitudinally of said shaft and normally secured thereon by set-screws 38. The chip-breakers rest upon the ends of the boards and hold them firmly during the trimming operation, and each chip-breaker is gouged out or cut away on one side, forming a curved surface 39, past which the knives revolve, and the lower blunt edges 40 of said surfaces bear by gravity upon the ends of the trimmed pieces and prevent them from slivering or splintering when engaged by the knives.

41 is a saw-arbor mounted in bearings on the ends of the timbers 21 and having a driven pulley 41′ and carrying saws 42, that are arranged to project for a considerable distance beyond the ends of the timbers, so that the ends of the lumber will be trimmed before reaching the timbers, and it will therefore be immaterial whether long or short pieces are fed to the machine, both being trimmed with equal facility. Upon each end of the arbor 41 I provide knife-heads 43, having sockets 44 to receive bolts 45, that are adapted to fit into slots 46 in knives 47. These knives have beveled cutting edges 48, that engage the upper surfaces of the pieces of lumber at the ends and cut away the corners, leaving beveled or inclined surfaces. The boards are firmly held during this operation by the weight of the chip-breakers and also by means of arms 49, that are secured to said breakers and extend past the knife-heads over the head-pieces. Any tendency of the lumber to move backward upon coming in contact with the saws is prevented by means of the gravity-dogs 50 and 51 engaging, respectively, the upper and under surfaces of the boards. After leaving the saws and the knives the head-pieces pass beneath guiding-strips 51, secured to the timbers on each side of the machine and overhanging the beveled ends.

Each reel-head is provided with a hole in the center to receive the spindle that supports the reel while the wire is being wound thereon and also to receive a stick usually employed in carrying the filled reels from place to place. To bore these holes accurately and rapidly, I provide an auger 52, mounted on a spindle 53, that is vertically slidable in bearings 54 on the cross-bar 55 connecting the upright timbers 56. A wide-faced pulley 57 is provided on said spindle and connected by a narrow belt 58 with a driven pulley 59, mounted on a shaft 60. The vertically-reciprocating movement to bore the hole and withdraw the auger after boring is imparted to it in any suitable manner; but I prefer to provide a collar 61 on said spindle, having flat faces 62, whereon the forked end of an arm 63 is pivoted. The arm 63 is pivotally supported at a point intermediate to its ends on a bolt 63′, that is vertically adjustable on a timber 64. An antifriction-roller 65 is provided on the free end of the arm 63 between two cams 66 and 67, that are mounted upon shafts 68 and 69. These shafts are provided with sprockets 70 and 71, that are connected with chains 72 and 73 with similar sprockets on the shaft 13. The revolution of the shafts 68 and 69 will cause the oscillation of the arm 63 and the raising and lowering of the auger, which is revolved during such vertical movement at a high speed through its belt connection with the driven pulley 59.

Over each saw and knife-head I provide the usual suction-spout 74 to take away the sawdust and fine refuse from the saw and knives.

The operation of the machine is as follows: Boards of any desired length, either short or long, as may happen, are piled one above the other in the hopper, and the reciprocating follower-block engaging the bottom board will push it out from beneath the others and feed it sidewise, so that its ends will be trimmed as they pass the saws. If it is desired to bevel the ends of the pieces, the knives are secured in the head-blocks, and as the ends of the boards pass beneath the knives and the chip-breakers their upper edges will be beveled, the chip-breakers bearing on the wood and preventing it from slivering or splintering. In running pieces of boards for the outer portion of each reel-head the knives are removed, as it is not necessary to bevel the ends of these pieces. After leaving the knives the pieces are fed forward beneath the auger, and as the center of each piece passes beneath it a hole will be bored therein, the operator having previously adjusted the walls of the hopper to provide for proper distance between the hopper and the auger, according to the width of the lumber to be bored. After leaving the auger the completed head-pieces pass out upon the horizontal table and from thence are removed by an attendant.

The saws project beyond the frame-timbers sufficiently to engage and trim or cut off boards of any desired length, and in trimming long pieces of lumber I prefer to substitute a longer follower-block for the one shown and allow it to operate between the end of the bracket-leg on one side and the supporting-guideway. I am thus able to feed short pieces of boards and trim their ends or long pieces that project out beyond the machine on one side. The cut-off portions of the long lumber, if of sufficient length, are again placed in the hopper and fed to the saws.

I claim as my invention—

1. The combination, with the trimming-saws, of a reciprocating feed device, revolving knives arranged to engage and bevel the boards, and chip-breakers having concave edges forming surfaces past which said knives revolve and resting upon the boards to prevent their ends from splintering by the action of the knives.

2. The combination, with the trimming-saws, of a feed device arranged to feed the lumber past the saws to trim the ends of the same, revolving knives arranged to bevel the ends of the trimmed boards, oscillating chip-breakers resting by gravity upon the boards and having curved surfaces past which said knives revolve, and arms provided on said chip-breakers and overhanging the boards, for the purpose specified.

3. The combination, with a suitable frame, of revolving knives or cutters mounted therein and laterally adjustable, a feed device arranged to feed lumber sidewise to said knives, and laterally-adjustable chip-breakers arranged to bear upon the ends of the boards and having curved edges past which said knives revolve, for the purpose specified.

4. The combination, with the trimming-saws, of a feed device arranged to feed lumber sidewise to the saws, revolving knives provided between said saws and arranged to engage and bevel the trimmed ends of the boards, a rock-shaft, chip-breakers secured thereon and resting by gravity upon the boards between the saws, and said chip-breakers having edges arranged to bear upon said ends near the knives, for the purpose specified.

5. The combination, with a suitable frame, of trimming-saws mounted therein, a hopper provided on said frame, a feed device operating in said hopper to advance the lumber sidewise to the saws, a revolving vertically-reciprocating auger arranged to engage the boards after they pass the saws, and the walls of said hopper being horizontally adjustable to permit the distance between them and said auger to be varied according to the width of the lumber.

6. The combination, with the trimming-saws, of a feed device arranged to feed the boards sidewise past said saws, means for engaging and beveling the trimmed ends of the boards, chip-breakers resting upon the ends of the boards and having curved surfaces past which said beveling means revolve, and gravity-pawls arranged to engage the upper and lower surfaces of the boards and prevent backward movement thereof.

7. In a machine of the class described, the combination, with trimming-saws, of beveling means provided between said saws, an auger near said saws and arranged to centrally bore each board passing between the same, a feed device arranged to feed the boards sidewise to said saws, chip-breakers, fingers mounted thereon and forming the inner wall of the hopper, and said fingers being adjustable toward or from said auger whereby the distance between them can be varied according to the width of the lumber to be bored.

8. In a machine of the class described, the combination, with trimming-saws, of an auger near said saws arranged to centrally bore each board passing between the same, means for clamping the boards during the trimming operation, a hopper having its inner wall supported on said clamping means and adjustable toward or from said auger, according to width of the board to be bored, and a feed device operating in said hopper to feed lumber sidewise to said saws.

9. The combination, with the trimming-saws, of a feed device arranged to feed boards sidewise to said saws, edge-beveling knives provided between said saws, said knives and saws being laterally adjustable, a rock-shaft, and gravity chip-breakers laterally adjustable thereon and having edges adapted to bear upon the ends of the boards near said knives.

In witness whereof I have hereunto set my hand this 6th day of June, 1903.

CHARLES JOHNSON.

In presence of—
RICHARD PAUL,
S. V. GRIFFIN.